Jan. 23, 1968
R. C. SEIWERT
3,364,563
METHOD OF MAKING AN INSULATED PANEL
Original Filed Oct. 8, 1963
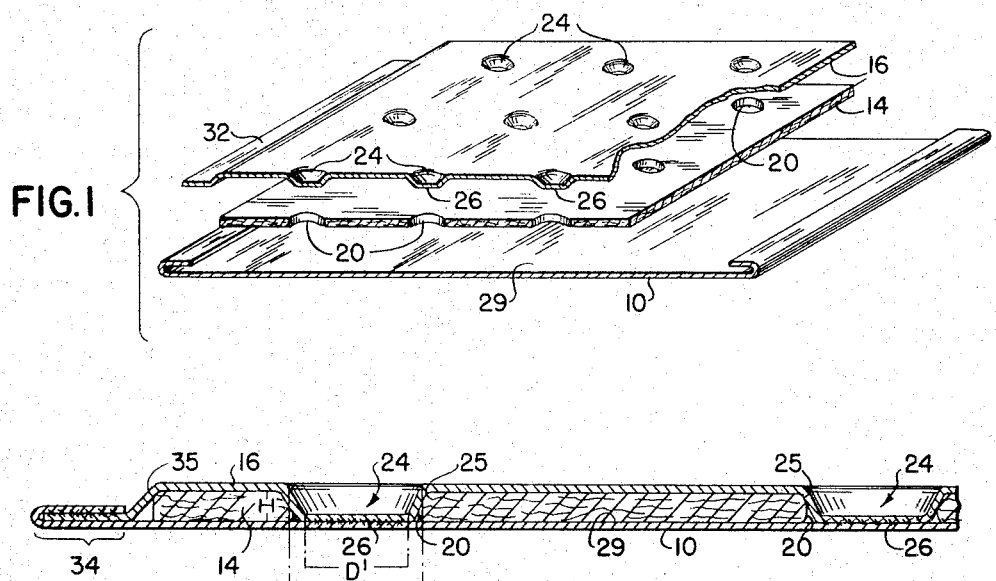
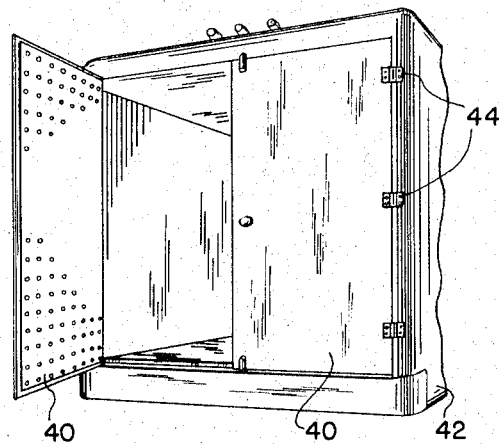
INVENTOR.
ROBERT C. SEIWERT
BY
*Watts & Fisher*
ATTORNEYS United States Patent Office 3,364,563
Patented Jan. 23, 1968

3,364,563
METHOD OF MAKING AN INSULATED PANEL
Robert C. Seiwert, Wooster, Ohio, assignor to Ohio Metalsmiths Corporation, Wooster, Ohio, a corporation of Ohio
Original application Oct. 8, 1963, Ser. No. 314,681, now Patent No. 3,256,669, dated June 21, 1966. Divided and this application Sept. 29, 1965, Ser. No. 491,198
3 Claims. (Cl. 29—471.3)

ABSTRACT OF THE DISCLOSURE

A reinforced rigid panel assembly is made by placing a stiff flat apertured core material between two hard outer panels, one of which is flat and one of which has embossments that extend into the apertures of the core to form a compressive interference fit. The two outer panels are joined together at the embossments and about the periphery of the panel.

---

This application is a division of my copending application Ser. No. 314,681 filed Oct. 8, 1963, and entitled, Panel, now Patent No. 3,256,669.

This invention relates to a method of fabricating a reinforced panel assembly, especially panel assemblies useful for doors for trucks or trailers and the like.

One of the problems involved in fabricating reinforced, strong, rigid metal panels suitable for doors is that of achieving a thin and light structure which is economical to fabricate and requires relatively small amount of material.

Other problems involved in the fabrication of reinforced panels is that of simplicity of construction, workmanlike appearance and economy while providing the required rigidity.

Briefly, in accordance with aspects of this invention, an improved reinforced metal panel assembly is made by using a pair of metal panels and an intermediate core of suitable material such as plywood, balsa, masonite, wallboard, aluminum, or any of the other light metals, the panels being joined to produce a "compressive interference fit" between the panels and the core. The metal panels may be designated as an inner and an outer panel depending on their intended position in a finished structure.

In making the panel assembly, the core material is first stamped, or cut, with a series of through relief holes in a predetermined pattern. The inner panel may be of steel or any other commercially available metal and is embossed in accordance with the pattern which was employed to cut relief holes in the core material. The depth of these embossments is approximately equal to the thickness of the core material. Next, the inner panel and the core material are compressively brought into engagement with the outer or face panel to form areas of contact between the outer surfaces of the embossments and the inner face of the outer panel. The embossments, or faces, may now be welded to the outer panel to compressively hold the core material between the two metal panels. Advantageously, this compression is both transverse and longitudinal relative to the panel assembly. With this novel structure, the core material is securely held in position and is placed under bi-directional compression. The perimeter of the inner and outer panels is now joined. For example, they may be welded or mechanically fastened by nuts and bolts, but preferably they are joined by forming a return flange joint by folding the face panel over the other of the panels in the area of their peripheries and then welding the two together.

Accordingly, it is an object of this invention to provide an improved method for making a reinforced metal panel assembly.

The above features and other objects of the invention will be more clearly understood from a reading of the detailed description of the invention in conjunction with the drawing in which:

FIGURE 1 is an exploded perspective view of one illustrative embodiment of this invention;

FIGURE 2 is a view, in section, of a portion of the illustrative embodiment of FIGURE 1 to a larger scale; and, FIGURE 3 is a view, in perspective, of a door panel assembly in accordance with this invention.

Referring now to FIGURE 1, there is depicted an exploded perspective view of one illustrative embodiment of this invention. As depicted there, the elements of a panel assembly include a smooth outer face panel 10, core 14, and a back panel 16. When these elements are joined in accordance with this invention, the result is a unitary reinforced panel assembly of greatly improved construction which is shown in section to an enlarged scale in FIGURE 2.

In constructing the panel assembly, the core is first stamped, or otherwise formed, with a plurality of holes 20 spaced about the area of the core in accordance with a predetermined pattern. Preferably, the holes are relatively small in comparison with the area of the remainder of the panel. For example, in one illustrative embodiment, the holes are circular and of the order of one inch in diameter. The holes are spaced apart approximately four inches measured to the embossment centers. This core is of the order of one-eighth of an inch in thickness and formed of fir plywood. The panels are of 24-gauge cold rolled steel and the resultant thickness of the completed panel is of the order of two-tenths of an inch and its weight per square foot is of the order of two and one-half pounds.

In making the back panel, a series of frusto-conical embossments 24 are stamped or otherwise formed in a pattern corresponding with the pattern used to make the holes in the core 14. The embossments 24 are formed with a smaller diameter, $D_1$, which is preferably smaller than the diameter of the holes 20 in the core 14 and with a larger diameter, $D_2$, which is preferably larger than the diameter of the holes 20. For example, the diameter of the holes 20 may be 1.00 inches and $D_1$ and $D_2$ may be .906 inch and 1.06 inches, respectively. The height H of the embossments is approximately equal to, and preferably slightly less than, the thickness of the core material 14. Thus the sloping surfaces of the embossments 24 force the core material away from the axis of the embossments in a compressive interference fit at 25, FIGURE 2, when the core is pressed into engagement with, or mounted on the face panel 16. These specific physical arrangements of the sizes and spacings of the embossments are, of course, arbitrary and any particular size of embossments and spacings between embossments may be employed as long as a compressive interference fit is obtained. A compressive interference fit between the back panel and the core is obtained when the sloping walls of the embossments compress the core.

After the core 14 is mounted on the back panel 16, embossment surfaces 26 are brought into engagement with inner surface 29 of the face panel 10. The panels are then connected together as by spot welding these areas of contact. The back and face panels are also joined about their peripheries 32 and 34, respectively. The peripheries are joined by overlapping the edges of the outer panel over the edges of the inner panel outside of the area occupied by the core 27 and the overlapped edges may be permanently connected such as by spot welding.

Ideally, further compressive interference is provided at 35 around the periphery of the core 14. With this described construction the face panel 10 is smooth and free of imperfections that might mar its appearance.

While other materials may be employed, cold rolled steel is particularly advantageous for the panels and these panels may be of the same gauge. For example, gauges in the order of 20 to 24 are suitable for use in this panel construction and other gauges may be employed depending upon the physical requirements of the panel.

Different types of cores may be employed. For example, core material may be plywood, balso, masonite, wallboard, aluminum, or any of the light metals available. Fir plywood has been found to be particularly advantageous because of its strength, durability, and cost and it may be used in thicknesses of the order of one-eighth of an inch and three-sixteenths of an inch depending upon the permissible weight per square foot of the resulting panel, the over all thickness permitted by the other factors of the structure, and the strength required.

It should be noted that while panels of greater thickness may be employed in some applications, one of the great advantages of this described construction is that for any given strength requirement a panel made according to this invention is considerably thinner than prior art panels. Thus, for example, in a refrigerator a wall of one inch thickness might replace a conventional four inch wall and in the disclosed trailer door a panel of three-sixteenths of an inch thickness will replace a one inch panel.

FIGURE 3 shows the panel assembly in its preferred use as a door 40 of a vehicle 42. This specific panel assembly is particularly suitable for such doors because it provides a relatively sturdy construction which is a savings of weight and an improvement from the standpoint of rigidity over the prior art devices. These panels, when employed as doors, have been found to be more economical, capable of better wear, and exhibit insulating properties over the prior art devices. The door 40 may be mounted on the panel body 42 by means of suitable hinges 44 of any convenient type well known in the art.

While I have shown and described one illustrative embodiment of this invention it is understood that the concepts of this invention could be applied to other embodiments without departing from the spirit and scope of this invention.

What is claimed is:

1. A method of making reinforced metal panel assemblies comprising the steps of:
   (a) punching a plurality of apertures in a predetermined pattern in a layer of core plywood material;
   (b) stamping a plurality of embossments in said predetermined pattern in a back metal panel;
   (c) placing said core in abutment with the back panel with each of said embossments disposed in a different one of the apertures and the back panel and core in a compressive interference fit at the base of each embossment;
   (d) placing said embossments in contact with a face panel;
   (e) welding the panels together at each of the areas of contact of the embossments with the face panel; and,
   (f) joining the peripheries of the panels by lapping a peripheral portion of the face panel over the periphery of the back panel and welding the lapped portion.

2. A method of making a rigid composite panel assembly comprising the steps of: providing first and second hard outer panels, the first panel having a plurality of embossments; providing a layer of stiff core material having apertures therethrough for receiving the embossments; said first and second panels being sufficiently rigid and said core material being sufficiently stiff so that the embossments and core can interact under load without substantial deformation; placing the core material between the first and second panels with the embossments projecting into the apertures of the core material, said embossments and apertures being constructed and arranged to provide an interference fit; compressing the first and second panels into engagement to form areas of contact between the embossments and the second panel to place the core material under bi-directional compression; and securely fastening the two panels together at areas of contact between the embossments and the second panel and also about the periphery of the first and second panels.

3. A method of making a rigid composite panel assembly from a relatively rigid core material and hard outer panels comprising the steps of: providing first and second hard outer panels, forming a plurality of embossments in a predetermined pattern in the first panel, providing a relatively stiff core material, forming a plurality of apertures in the said predetermined pattern in the layer of stiff core material correlated in size and shape with the embossments so that the embossments and core can fit together in an interference fit, placing the stiff core material in abutment with the said first panel with each of said embossments disposed in a different one of the apertures in the core material, compressing the embossments into the apertures to provide a compressive interference fit around each embossment and to connect the first panel and core material together in a fixed relationship, placing the second panel against the core material in contact with the embossments of the first panel, and connecting the two panels together at the embossments of the first panel and about the periphery of the first and second panels.

References Cited

UNITED STATES PATENTS

| | | | |
|---|---|---|---|
| 1,784,511 | 12/1930 | Carns | 52—574 |
| 2,391,997 | 1/1946 | Noble. | |
| 3,011,602 | 12/1961 | Ensrud et al. | |
| 3,072,520 | 1/1963 | Groth | 156—213 |

CHARLIE T. MOON, *Primary Examiner.*